United States Patent [19]

Björk

[11] Patent Number: 4,789,039
[45] Date of Patent: Dec. 6, 1988

[54] AIR-CUSHION ELEMENT FOR AIR-CUSHION TRANSPORT EQUIPMENT

[76] Inventor: Peter Björk, Akerleden 4, 68600 Jakobstad, Finland

[21] Appl. No.: 603,326

[22] Filed: Apr. 24, 1984

[30] Foreign Application Priority Data

Apr. 27, 1983 [FI] Finland ............................ 831433

[51] Int. Cl.$^4$ .............................................. B60V 1/00
[52] U.S. Cl. ................................... 180/124; 180/125
[58] Field of Search ...................... 180/124, 125, 116

[56] References Cited

U.S. PATENT DOCUMENTS 3,981,546  9/1976  Sperman .......................... 180/125
4,172,506  10/1979 Terry ............................... 180/125

Primary Examiner—Douglas Hart
Attorney, Agent, or Firm—Kuhn and Muller

[57] ABSTRACT

In the present publication, an air-cushion element (1 to 5) for air-cushion transport equipment is described. The element comprises a disc-shaped frame (1), a ring-shaped rubber bellows (2) arranged air-tight underneath and frame (1), a membrane (4) with a high number of small perforations (5), attached to the bottom edge of the rubber bellows (2) so that the frame (1), the rubber bellows (2), and the membrane (4) define a space (6) for outflowing air, and at least one opening (3) for the feeding-in of pressurized air into the space (6). According to the invention, in this connection, the perforations (5) in the membrane (5) are arranged irregularly in relation to orthogonal or polar coordinates, for example, along a so-called spiral of Archimedes. Air-cushion transport equipment with air-cushion elements in accordance with the present invention can also be used when there is a discontinuity or a difference in level between two faces, such as in the case of slots in the floor or between platforms that can be raised and lowered.

7 Claims, 3 Drawing Sheets

AIR-CUSHION ELEMENT FOR AIR-CUSHION TRANSPORT EQUIPMENT

The present invention is concerned with an air-cushion element in accordance with the preamble of claim 1.

It is typical of air-cushion elements of this type that they are provided with a perforated elastic membrane that lies against the face over which the air-cushion unit is to be displaced. When air whose pressure is higher than that of the environment is introduced into the space inside the membrane, a lifting force is obtained that corresponds to the air pressure multiplied by the total carrying face. When the lifting force exceeds the load concerned, an air film is obtained between the element and the air-tight face, on which film the unit can be transported.

Examples of air-cushion elements of the type described above are described, e.g., in the GB Patent No. 1,495,614 and in the U.S. Pat. No. 3,760,899. The former of these is provided with a bottom membrane with perforations arranged regularly (i.e. in lines), and the latter one is provided with a bottom membrane of porous construction.

In the case of completely air-tight and plane faces, there are no problems regarding the use of the above technique. The air-tight face permit a controllable supply of air into the element when the necessary air film is being formed.

As soon as the element passes across a discontinuity in the face or across a difference between two faces, the element, however, loses its ability to form the necessary air film. The air flows out of the element in an uncontrollable way and the element loses its carrying capacity, at the same time as the noise level increases strongly.

The above problems have resulting in the circumstance that air-cushion based transport systems have, until now, been confined to completely plane and air-tight faces or to areas where the base can be tightened by means of a metal sheet, mat, tape, or some other material.

The object of the present invention is to eliminate the above drawbacks and to permit the use of the air-cushion technique also over faces that include joints or that are in other respects not entirely plane or air-tight. Hereat, air-cushion transport equipment can be used even if there is a discontinuity or a difference between two faces, such as in the case of slots in the floor or between platforms that can be raised and lowered.

The above objective is achieved by means of air-cushion elements in accordance with the present invention, which are based on the idea that the perforations in the membrane are placed in a random way in particular in relation to orthogonal coordinates.

More specifically, the air-cushion element in accordance with the invention is characterized in what is stated in the characterizing part of claim 1.

By means of the invention, a number of essential advantages are obtained. If the perforated membrane is, e.g., mounted underneath an existing air-cushion equipment, the range of operation of this equipment can be increased so that it also covers faces that include discontinuities and differences in level, without having to use a mat or a tape.

The invention also permits the use of air-cushion technique in premises where particular requirements are imposed on low noise level, because the noise level is not increased to a significant extent when the perforated cushion passes across, e.g., a slot in the underlying base.

The perforated membrane can be applied readily onto an air-cushion element of standard type, and it can also be replaced in a simple way if it is damaged or worn out.

The air-cushion element in accordance with the invention will be described in more detail in the following with reference to the exemplifying embodiments in accordance with the attached drawings.

The perforated membrane, hereinafter "fabric", may either be attached to a prior art air cushion, e.g. any of the types described in the U.S. Pat. No. 3,618,694 (Aero-Go Inc.) and in the GB Patent No. 1,096,120 (General Motors), or it may also constitute an entirely novel construction.

Figure 1:
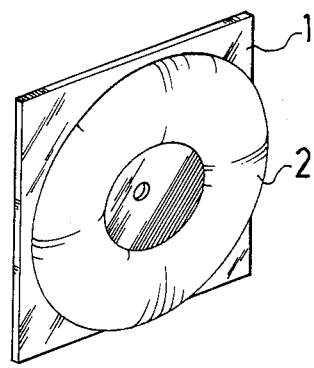
FIG. 1 is a perspective view of a conventional air-cushion element, which can be completed by means of a perforated membrane to make an element in accordance with the invention.
Figure 2:
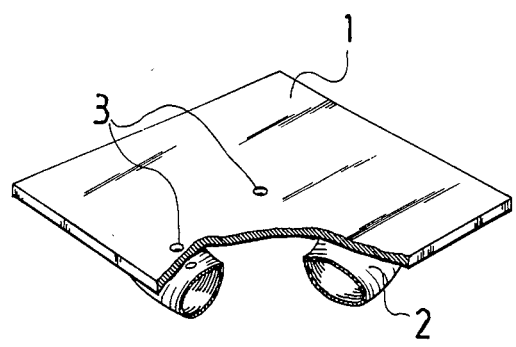
FIG. 2 is a partial sectional view of the element shown in FIG. 1.

The frame onto which the perforated fabric 4 is attached consists of an air-cushion element of a prior-art type, in accordance with FIG. 1. Elements of this type are manufactured as a number of different sizes depending on the desired lifting capacity.

The element consists of an annular bellows 2 made of a reinforced rubber material. The air-cushion bellows 2 is permanently vulcanized onto an anodized aluminum sheet 1. The supply of air takes place through two openings 3 in the aluminum sheet 1.

The perforated fabric 4 must be made of a material that is highly resistant to abrasion and has a smooth face with a low friction against the base. The material must also be reinforced in order to prevent any stretching.

The perforations (holes) 5 must be made depending on the extent of the discontinuities and differences in level that occur in the underlying base as well as on the range of weight within which the load may vary.

The holes 5 may be made by means of a heated point, or drilled by means of friction drilling. If the holes are punched, the edges of the holes remain soft and elastic.

If there is space enough, it is possible to choose an air-cushion element with a face larger than normal in order to be able to maintain the working pressure in the element at a low level.

Figure 3:
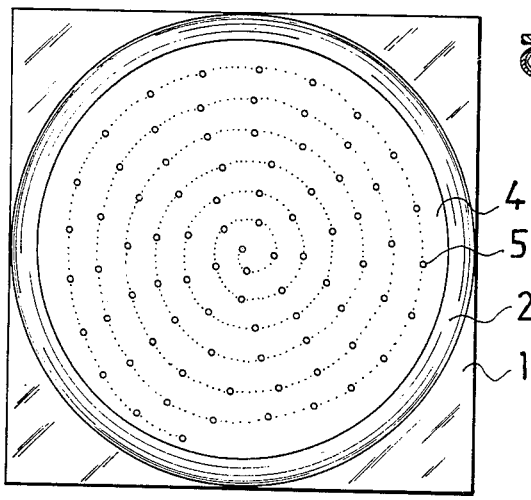
FIG. 3 shows an element in accordance with the invention as viewed from below.
Figure 4:
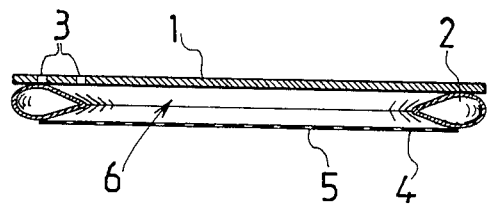
FIG. 4 is a sectional view of the element shown in FIG. 3.
Figure 5:
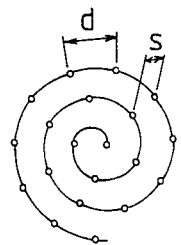
FIG. 5 shows the principle of the distribution of the perforations in accordance with one embodiment of the invention.

The exemplifying embodiment in accordance with FIGS. 3 to 5 shows an air-cushion element that has been developed for use when operating across platforms that can be raised and lowered when the distance between the platforms is at the maximum 10 millimetres and when there may be differences in level of no more than 6 millimeters between the platforms.

As a frame for the perforated air cushion, an air-cushion element of standard type is used, wherein the outer diameter of the air-cushion bellows 2 is 1230 mm. Its construction comes out from FIGS. 3 and 4.

The fabric 4 is 0.45 mm thick and has a nylon base and neoprene surface. It is cut to a circular disc, which is then fixed onto the air-cushion bellows 2 by glueing. The holes 5 are made along a so-called spiral of Archimedes with a constant spacing of the holes along the spiral line. The pitch s of the spiral is 7 millimeters per revolution and the hole distance d is 14 millimeters. The diameter of the holes is 0.7 mm.

In connection with trial runs of the perforated air cushion, the results have been compared with the air cushion that was used as the frame for the perforated fabric, on one hand, and with an air cushion wherein the fabric consists of a porous fabric in accordance with the GB Patent No. 1,308,441, on the other hand. The trial runs were performed both on a plane base (plywood sheet) and across a joint slot of a width of 10 mm. The load was varied from 40 kg to 1500 kg.

Figure 6:
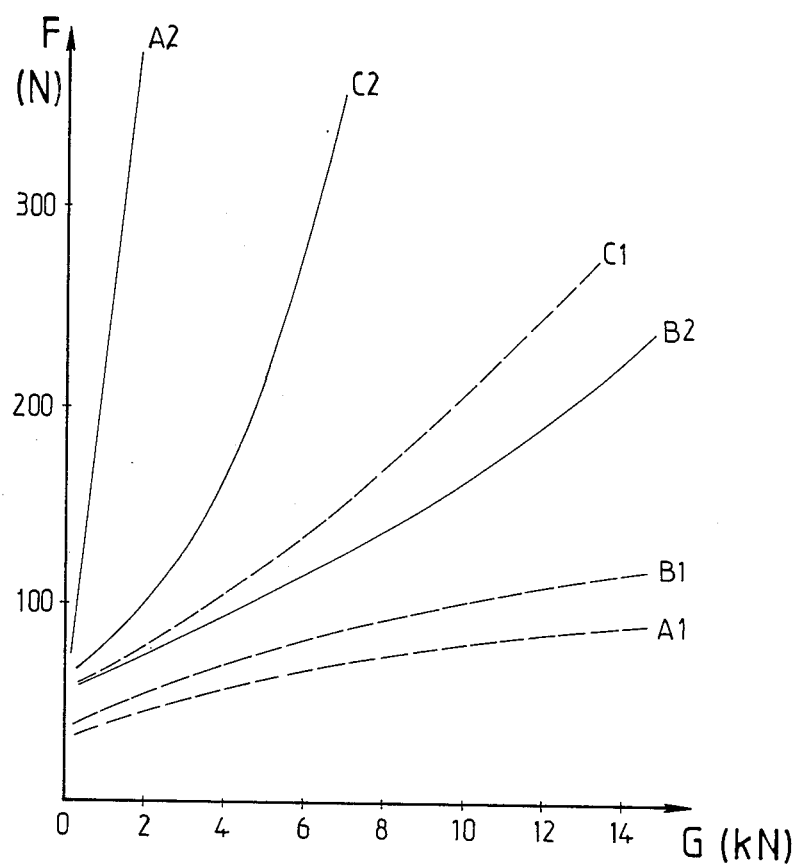
FIG. 6 is a graphical presentation of the tractive effort as a function of the load in a comparison between an air-cushion element in accordance with the invention and prior art elements.

The result of the trial run comes out from FIG. 6. The diagram shows the tractive effort that is required in order to displace the load, as a function of the loading. The curves in dashed lines indicate the trial run on smooth base, whereas the curves in full lines indicate the running across the joint. The curves are denoted with A1 and A2 for the standard air-cushion element, with B1 and B2 for the perforated air cushion, and with C1 and C2 for the air cushion with the porous fabric.

The results show that the standard cushion requires the lowest tractive effort on a smooth base (A1). When a joint or difference in level is crossed, the tractive effort, however, very rapidly increases to values that indicate that the element has totally lost its carrying capacity (A2). At the same time, the air consumption and the noise level of the element also increase strongly.

The air-cushion element with the porous fabric already requires a high tractive effort even on a smooth base (C1). Since the face is porous, the air film between the fabric and the base becomes extremely thin, which causes higher friction. When the air-cushion element then passes across a joint, air leaks out of the element along all of the face of the element that coincides with the joint. Therefore, the tractive effort also increases here very steeply while the air consumption increases (C2).

On a smooth base, the perforated air cushion requires a somewhat higher tractive effort than the standard cushion does (B1). When a joint is crossed, the required tractive effort increases to some extent, but not at all to the same extent as with the other two variations of air cushions (B2). Both the air consumption and the noise level also remain substantially constant.

The air-cushion element in accordance with the present invention may, of course, differ from the embodiment described above.

Figure 7:
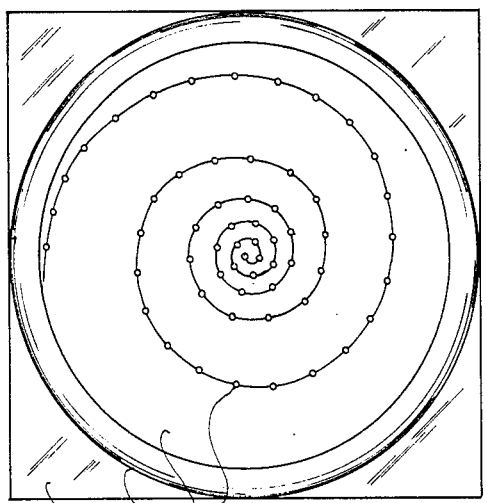
FIG. 7 shows a second embodiment of an air-cushion element in accordance with the invention as viewed from below.

The air-cushion element in accordance with FIG. 7 is of the same construction as the element shown in FIGS. 3 to 5, but the perforations 5 in the fabric have been made along a logarithmic spiral.

Figure 8:
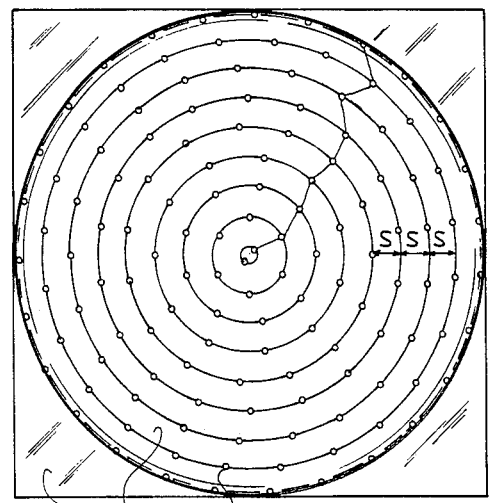
FIG. 8 shows a third embodiment of an air-cushion element in accordance with the invention as viewed from below.

In the construction in accordance with FIG. 8, the perforations 5 are arranged at a constant distance from each other along circular lines in which the distances between the radii of the circles are denoted with s.

Figure 9:
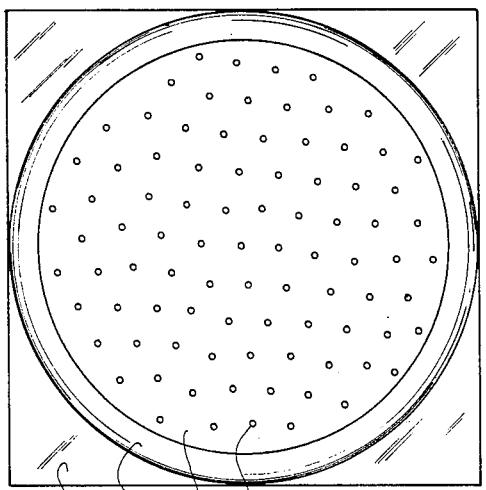
FIG. 9 shows a fourth embodiment of an air-cushion element in accordance with the invention as viewed from below.
Figure 10:
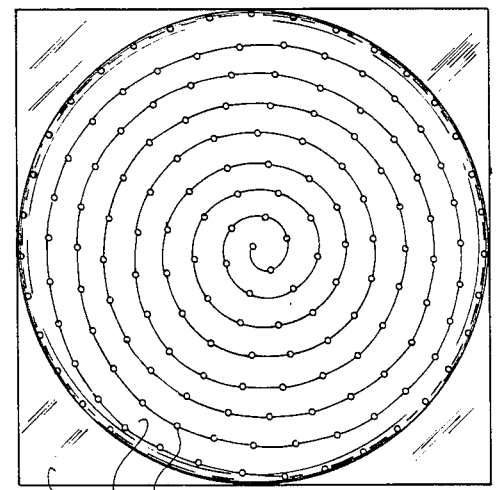
FIG. 10 shows a fifth embodiment of an air-cushion element in accordance with the invention as viewed from below.

In the construction in accordance with FIG. 9, the locations of the perforations 5 are determined by means of random number generation. The upper and lower marginal values for the number of holes per unit of area must be determined in the same way as in the embodiment in accordance with FIGS. 3 to 5.

Figure 11:
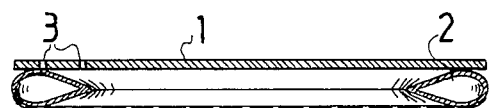
FIG. 11 is a sectional view of a sixth embodiment of the air-cushion element in accordance with the invention.

The construction in accordance with FIG. 11 is the same as that of the element shown in FIGS. 3 to 5, but here the bottom face of the air-cushion bellows 2 is also provided with perforations. This air cushion is in particular suitable for operation on a base with large differences in level ($\leq 20$ mm).

It comes out from the above (see, e.g., FIG. 8) that the perforations 5 are arranged in such a way that as few perforations as possible are placed on the same straight or otherwise regular line. In this way, the effects of the most typical irregularities (e.g., linear or regularly arcuate joints) in the base can be eliminated to a great extent.

What is claimed is:

1. Air-cushion element for aircushion transport equipment, comprising:
    a frame, having a ring-shaped collar portion with a bottom edge, which is arranged in a air-tight manner underneath the frame;
    a membrane with a relatively high number of relatively small perforations, attached to the bottom edge of the collar portion so that the frame, the collar portion, and the membrane define a space for outflowing air, the perforations in the membrane being arranged irregularly relative to orthogonal or polar coordinates; and
    at least one opening for the supply of pressurized air into the space.
2. Air-cushion element as claimed in claim 1, wherein the perforations are arranged in a random way.
3. Air-cushion element as claimed in claim 1, wherein the perforations are arranged along a so-called spiral of Archimedes.
4. Air-cusion element as claimed in claim 1, wherein in the perforations are arranged long a logarithmic spiral.
5. Air-cushion element as claimed in claim 1, wherein the perforations are arranged along circular lines.
6. Air-cushion element as claimed in any of the claims 3 to 5, wherein the perforations are arranged at a constant mutual distance along the spiral or circle line.
7. Air-cushion element as claimed in claim 1, wherein the collar portion comprises a bellows construction and the bottom face of the bellows construction is also perforated.

* * * * *

UNITED STATES PATENT AND TRADEMARK OFFICE
CERTIFICATE OF CORRECTION

PATENT NO. : 4,789,039

DATED : Dec. 6, 1988

INVENTOR(S) : Peter Bjork

It is certified that error appears in the above-identified patent and that said Letters Patent is hereby corrected as shown below:

Column 4, Claim 4, line 53, "long" should be --along--.

Signed and Sealed this

Sixteenth Day of May, 1989

Attest:

DONALD J. QUIGG

Attesting Officer

Commissioner of Patents and Trademarks